US008489659B2

(12) United States Patent
Dunbar

(10) Patent No.: US 8,489,659 B2
(45) Date of Patent: Jul. 16, 2013

(54) PSEUDORANDOM NUMBER GENERATION

(75) Inventor: Bruce Dunbar, Andover, MA (US)

(73) Assignee: Schneider Electric USA, Inc., Palatine, IL (US)

( * ) Notice: Subject to any disclaimer, the term of this patent is extended or adjusted under 35 U.S.C. 154(b) by 1505 days.

(21) Appl. No.: 11/875,510

(22) Filed: Oct. 19, 2007

(65) Prior Publication Data

US 2009/0106338 A1 Apr. 23, 2009

(51) Int. Cl.
*G06F 1/02* (2006.01)
(52) U.S. Cl.
USPC .............................. 708/250; 708/251; 380/46
(58) Field of Classification Search
None
See application file for complete search history.

(56) References Cited

U.S. PATENT DOCUMENTS

| 3,250,855 | A | | 5/1966 | Vasseur | |
|---|---|---|---|---|---|
| 3,881,099 | A | * | 4/1975 | Ailett et al. | 708/253 |
| 4,404,426 | A | * | 9/1983 | Safford | 380/46 |
| 5,317,528 | A | | 5/1994 | Gofman | |
| 5,541,996 | A | | 7/1996 | Ridenour | |
| 5,570,307 | A | | 10/1996 | Takahashi | |
| 5,850,450 | A | | 12/1998 | Schweitzer et al. | |
| 6,104,811 | A | * | 8/2000 | Aiello et al. | 380/46 |
| 6,219,421 | B1 | * | 4/2001 | Backal | 380/28 |
| 6,230,269 | B1 | | 5/2001 | Spies et al. | |
| 6,573,800 | B2 | * | 6/2003 | Rosen et al. | 331/78 |
| 6,691,141 | B2 | | 2/2004 | Schmidt | |
| 6,745,217 | B2 | | 6/2004 | Figotin et al. | |
| 7,016,925 | B2 | | 3/2006 | Schmidt | |
| 7,243,117 | B2 | * | 7/2007 | Yamamoto et al. | 708/250 |
| 2009/0077146 | A1 | * | 3/2009 | Hars | 708/251 |

FOREIGN PATENT DOCUMENTS

| DE | 1047837 | 12/1958 |
|---|---|---|
| EP | 0388131 | 9/1990 |
| GB | 954313 | 4/1964 |

OTHER PUBLICATIONS

Written Opinion and International Search Report for PCT/US2008/080431 mailed Feb. 13, 2008, 10 pages.
T. Addabbo, et al., "A Class of Maximum-Period Nonlinear Congruential Generators Derived From the Renyi Chaotic Map", IEEE Transactions on Circuits and Systems-I: Regular Papers, vol. 54, No. 4, Apr. 2007.
J. Tattersall, "Elementary Number Theory in Nine Chapters", Cambridge University Press, 1999, pp. 109, 117, 173-177.
A. Papoulis, "Probability, Random Variables, and Stochastic Processes", McGraw-Hill, 1965, pp. 189, 266-268.
J. Walker, "ENT: A Pseudorandom Number Sequence Test Program", available at http://www.fourmilab.ch/random/, 1998., downloaded Oct. 30, 2007.
A. Haas, "The Multiple Prime Random Number Generator", ACM Transactions on Mathematical Software, vol. 13, No. 4, Dec. 1987, pp. 368-381.

(Continued)

*Primary Examiner* — Michael D Yaary
(74) *Attorney, Agent, or Firm* — Banner & Witcoff, Ltd.

(57) ABSTRACT

A system and method of for obtaining a pseudorandom number generator are disclosed. A set of state modules, each with a limit value, may be provided. In an embodiment, each of the limit values may be relatively prime to the other limit values. In response to one or more events, the values of the state modules are incremented. At some frequency that may be statistically independent from the occurrence of the one or more events, the values of the state modules are obtained and combined to form a random number. The values may be combined as desired and, if desired, may be combined modulo $2^w$, where $2^w$ represents the number of possible random values.

18 Claims, 12 Drawing Sheets

OTHER PUBLICATIONS

P. L'Ecuyer, "Software for Uniform Random Number Generation: Distinguishing the Good and the Bad", Proceedings of the 2001 Winter Simulation Conference, IEEE Press, Dec. 2001, pp. 95-105.

P. Hellekalek, "Inversive Pseudorandom Number Generators: Concepts, Results, and Links", available at http://random.mat.sbg.ac.at/generators/wsc95/inversive/inversive.html, Sep. 1996.

K.H. Rosen, "Handbook of Discrete and Combinatorial Mathematics", CRC Press, 2000, pp. 226-235.

L. Toth, "The Probability that k Positive Integers are Pairwise Relatively Prime", The Fibonacci Quarterly, vol. 40, No. 1, Feb. 2002, pp. 13-18.

D.E.Knuth, "The Art of Computer Programming", vol. 2 / Seminumerical Algorithms, Chapter Three, Random Numbers, Reading MA: Addison-Wesley,1969.

* cited by examiner

PSEUDORANDOM NUMBER GENERATION

BACKGROUND

1. Field of the Invention

The present invention relates to the field of random number generation, more particularly to the field of pseudorandom number generation.

2. Description of Related Art

Random numbers have a variety of uses; for example, the use of random numbers is prevalent in applications such as cryptography, testing of digital circuits and telecommunication systems. However, one common issue is how the random numbers are generated. Typically an initial value (commonly referred to as a seed value) is used to provide an input to algorithm. The algorithm then outputs a number based on the seed value. As can be appreciated, one potential issue with this approach is that if the algorithm and the seed value are known, the resultant random number can be predicted (and thus is not actually random).

One method of overcoming this issue is to use random seed values based on, for example, atmospheric noise. This tends to be somewhat complex, however, and therefore is less suitable for many systems where cost and/or access to atmospheric noise (or the equivalent) is an issue. Therefore, it is relatively common to use a pseudorandom number generator (PRNG) algorithm that can provide a random number without requiring a completely random seed value. While a PRNG algorithm provides the same output for a given input, if the seed value and/or other inputs are obscured then resultant random value will have the appearance of being random to an observer.

Therefore, PRNGs attempt to provide a value that is not easily predicted based on a seed value that may or may not be known. Known examples of PRNGs include a linear feedback shift register ("LFSR") and linear congruent generator ("LCG"). One theoretical issue with linear algorithms is the potential for patterns to emerge, thus making such algorithms less suitable for applications such as cryptology.

Nonlinear generators such as the known Blum, Blum and Shub generator have also been proposed. Well designed nonlinear types of PRNGs generally do not exhibit the type of predictable outcome more common with linear PRNGs. However, the drawback to such nonlinear generators is that they typically have higher complexity and require greater computational resources, thus making them less suitable for many systems. Therefore, the selection of the type of algorithm (linear versus nonlinear) raises issues related to computation resources available.

Another issue is the range of values possible. While it is theoretically possible to use a very large range of values, such as a range covered by $2^{64}$, this tends to be expensive in practice because of the memory needed to store large numbers, particularly on systems that have lower computational requirements. In other words, the memory allocation is directly related to the possible size of the random number. For example, an 8-bit word (or $2^8$ sized number) would have a range of values between 0 and 255. A 16-bit word ($2^{16}$ sized number) would have a range of values between 0 and 65,535 but will require twice the memory. Therefore, to save space, often a smaller range of values will be used but attempts will be made to make the selection of values within that range as random as possible.

Accordingly, to reduce costs, and to improve performance of the random number generator from a statistical perspective, it is desirable to obtain a number from a random number generator that is statistically likely to be selected anywhere within the possible range of values. Furthermore, it is desirable that PRNG has a large number of unique states so that it does not repeat itself for as long as possible; this is commonly referred to as a period of a PRNG. As can be appreciated, resolution of the issue regarding resource allocation versus statistical predictability versus period is often a compromise. Thus, a PRNG that can offer a different resolution to this issue would be appreciated.

SUMMARY

A set of state modules with a plurality of limit values are provided. The limit values of the state modules may be relatively prime. In response to an event occurring at instants t, the values of the state modules are changed. At some other instants t', which are independent from the instants t, the values of the state modules are obtained and combined to form a random number. In an embodiment, the values are combined modulo $2^w$, where $2^w$ represents the maximum size of the random value.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which.

DETAILED DESCRIPTION

In the description that follows, various aspects are disclosed that may be used alone or in combination with other aspects. Therefore, to improve readability and organization, certain sections include headings. The grouping of information, however, is not otherwise intended to limit possible combinations or suggest features are required to be used together unless otherwise noted. With respect to the figures, it should be noted that certain conventional details, such as power supplies and user interfaces such as keypads have been omitted for the purpose of clarity.

Figure 1A:
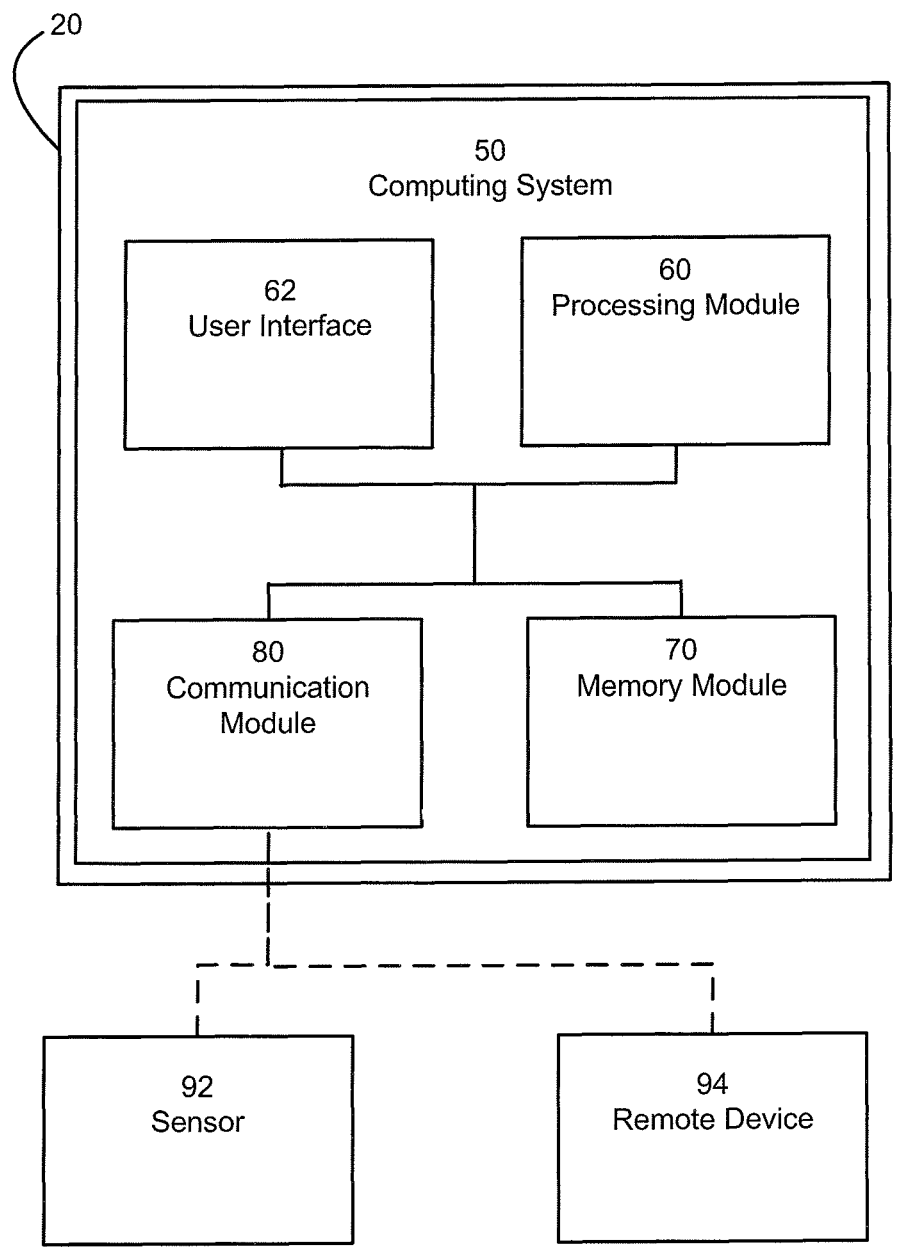
FIGS. 1a and 1b illustrate a schematic representation of computing systems that may be used in accordance with at least one embodiment of the present invention.

FIG. 1a depicts a schematic of a computing system 50, which is typically positioned within a housing 20. As depicted, the computing system 50 includes a processing module 60, a user interface 62, a memory module 70 and an optional communication module 80. Other conventional components of the computing system 50 are omitted for the sake of clarity. The processing module 60 may be a convention CPU that is configured to perform one or more operations such as, but not limited to, addition, subtraction and exclusive disjunction ("XOR"). Thus, the processing module 60 may be a conventional microprocessor or microcontroller capable of a number of different functions or may be a simpler design that is only capable of the most basic functions such as addition, depending on cost and performance requirements. In addition, the processing module may be an array of processing components, operating in a distributed network configuration. For example but without limitation, the processing module may include a plurality of microprocessors coupled together by a backplane. The memory module 70 may comprise one or more types of memory, such as volatile or non-volatile memory, may be writeable or read-only and may be random access or serial access, as desired. In an embodiment the memory module may be a combination of one or more types of memory locating in physically different locations, either on the local device or in a distributed manner. It should be noted that while depicted as a set of individual modules, the functionality may be grouped in a desired manner, such as is common with integrated circuits. Thus, the processing module 60 and the memory module 70 are logical rather than physical elements. The memory module 70 and the processing module 60 are in communication with each other so that information in the memory module 70 can be accessed and operated on by the processing module 60 and so that data can be stored as desired in the memory module 70.

While not required, the communication module, which may be for example, but without limitation, a device driver and convention network port, can allow the processing module 60 to receive input from an external source. It should be noted that a distributed processing module 60 would include a communication system so that the distributed processors could communicate, however such communication does not require communication with an external device and therefore is considered distinct from the communication module 80, although an appropriately designed communication module 80 could be responsible for such communication as well. Thus, as can be appreciated, the depicted schematic is a logical representation and variations in hardware design may be made according to known system requirements and design choices.

While the details of the operation of a state module are discussed below, computing system 50 is suitable for implementing such a state module. In an embodiment, a set of computing systems may be arranged so that each acts as a state module and another computing system acts as a generating module or a controlling module. Alternatively, a single computing system may include one or more threads that include some number of counters that act as state modules while the computing system also acts as the generating module. Variations of either combination are also contemplated, depending on the system configuration and the computing resources available in the one or more processors.

As depicted, a sensor 92 is shown as having a dotted line connection with the communication module 80. While the sensor 92 may be positioned within the housing 20, in an embodiment the sensor 92 may provide external information at some predetermined frequency. Also depicted is a remote device 94, which may be in communication with the computing system 50 via communication module 80. The remote device 94 may be any type of device that can communicate with the computing system 50. It should also be noted that the communication between the computing system 50 and external device 94 (and/or sensor 92) may be wired or wireless in nature and utilize any desirable protocol for communication. If the sensor 92 is analog sensor then the communication module 80 (or the processor module 60) may convert the signal to a digital signal using a convention analog to digital converter.

The user interface 62, which is optional, allows users to interact with the system. Touch screens, and keyboards are common types of user interfaces but any desirable user interface may be used, include biometric sensors, indicia scanners and the like. The user interface may accept inputs via physical interaction or via a wireless signal. In an embodiment, the computing system 50 may generate a random number in response to an input received from a user via the user interface.

Figure 1B:
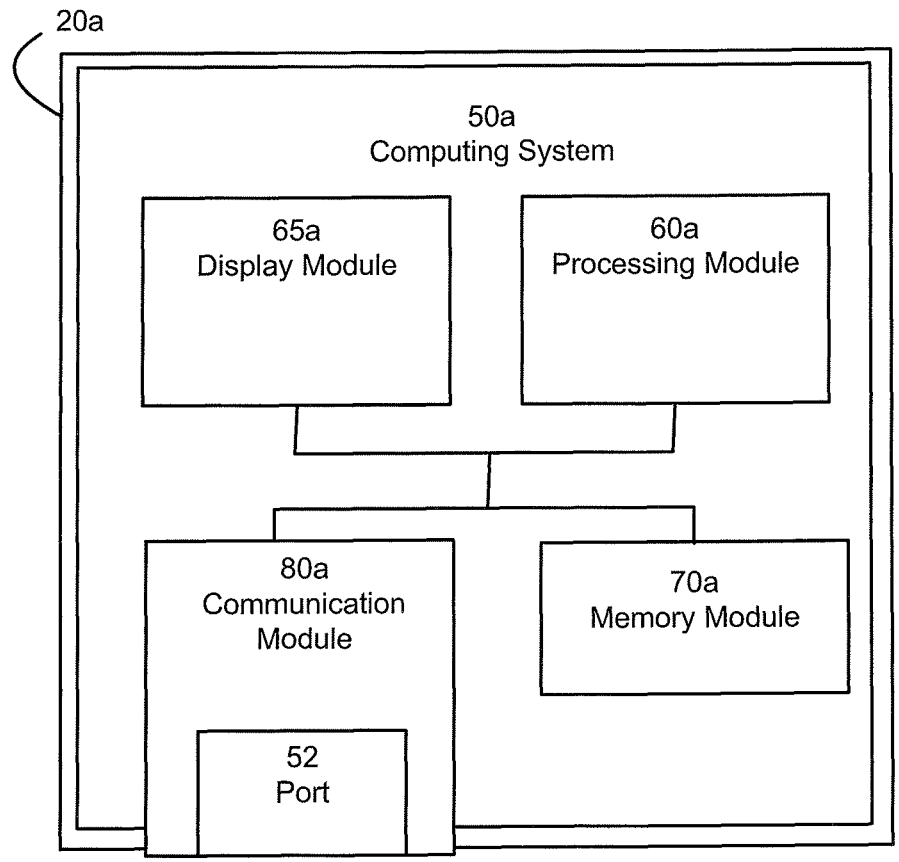

FIG. 1b illustrated an alternative embodiment of a computing system 50a that may be used with one or more aspects of the present invention. As depicted, a processing module 60a coupled to an optional display module 65a, a memory module 70a and a communication module 80a, all provided in a housing 20a. The processing module 60a can be relatively simple and only capable of limited types of operations or may include a full range of operations, such as is common with conventional CPUs. The optional display module 65a can be a simple display such as is found in inexpensive calculators and the like or it may provide the ability to discrete more complex images such as pictures and/or graphics. The memory module 70a may a single block of memory or a combination of a number of blocks in different locations and with different physical properties (such as volatile and non-volatile, random access or serial access, read-writable or read only, etc. . . . ). The communication module 80a may be configured as desired to communicate over a selected protocol and may be wired or wireless. As depicted, the communication module includes a port 52 for coupling with other systems in a conventional manner. In an embodiment, the computing system 50a could be implemented in a smart card or the like (with or without the display module 65a), although the computing system 50a may be otherwise configured to include greater processing power than is typically available on devices such as smart cards.

It should be noted that unless otherwise specified, the term frequency is not restricted to occurrences taking place in a periodic manner, such as might be observed in simple sinusoidal patterns. Rather, the term frequency refers to the concept that an event occurs, and then at some later time, another event occurs. For example, a possible event might be a query received from a remote device that could occur at regular or irregular intervals. Thus, the term frequency as used herein refers to a relative rate of occurrence and is not intended to be limiting with respect to whether the event occurs in a regular or irregular manner. Furthermore, a predetermined frequency may not have the time period between events remain the same but rather may vary the time period, to the extent there is a variance, in a substantially predetermined manner. For example, a predetermined frequency might have a period of one time segment between the first two events, a period of two time segments between the next two events, and then go back to the period of one time segment again between the next two events, the period alternating between the one and the two segments of time.

Figure 2:
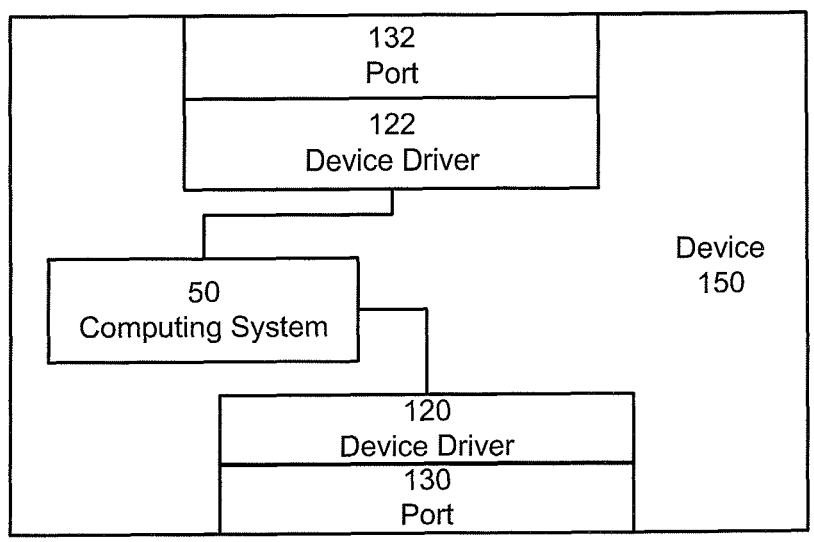
FIG. 2 illustrates a schematic representation of a device with a computing system that may be used in accordance with an embodiment of the present invention.

FIG. 2 depicts a schematic of device 150 configured to communicate with two other devices. The device 150 includes ports 130, 132 that are driven by device drivers 120, 122, respectively. It should be noted that one or both of the ports 130, 132 may be configured to for wireless communication, in which case the ports would include components for wireless communication, such as a transceiver and an antenna. As is known, the protocol driver (e.g., device driver) provides the necessary abstraction between the physical layer of the specific hardware being used and logical layer of the computing system. For ease of comprehension, FIG. 2 is a simplified schematic, thus the port 130 may be a plurality of ports coupled together via a backplane in a known manner. Furthermore, different ports may have different hardware requirements, and thus require different device drivers. It should further be noted that additional ports with unique device drivers may be used as desired.

Figure 3A:
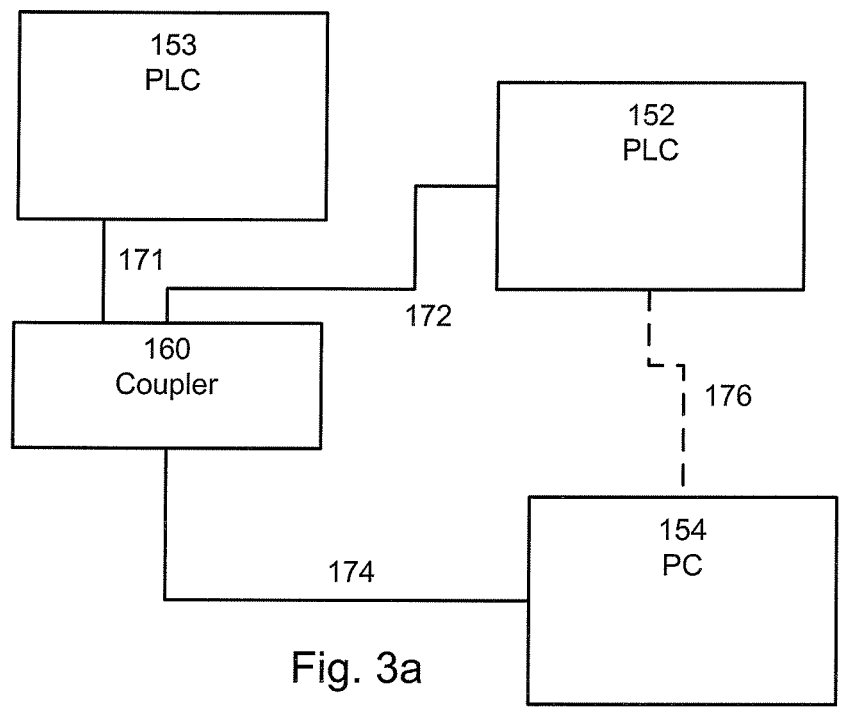
FIGS. 3a and 3b illustrate a schematic of systems that may use in accordance with at least one embodiment of the present invention.

FIG. 3a illustrates a schematic of a potential system that includes a programmable logic controller ("PLC") 152 and a PLC 153 in communication with a personal computer ("PC") 154 by a coupler 160 through communication links 171, 172 and 174. PLCs are known and are conventionally used to control and/or monitor processes and/or devices. For example, a PLC is commonly used to actuate devices and/or to monitor one or more sensors on a periodic basis. While only two PLC is shown for simplicity sake, often a larger set of PLCs will be used to control a system. If the PC 154 was monitoring and controlling a number of PLCs that made up a control system, the PC 152 might query one or more of the PLCs at an appropriate frequency to determine its respective status. The coupler 160, which may be a convention network router, may act as a repeater so that the signal sent from the PLC, along for example communication link 173, is provided to the PC 154, and vice versa. Alternatively, the coupler 160 may convert the communications being transmitted between the PLC 152 and the PC 154 from one format to another (such as, without limitation, from Fieldbus to Ethernet or from wireless to wired or some combination thereof). In addition, the PLC 152 may be directly coupled to the PC 154, as shown by communication link 176, which may represent a backplane type connection or some other type such as wired or wireless communication.

Figure 3B:
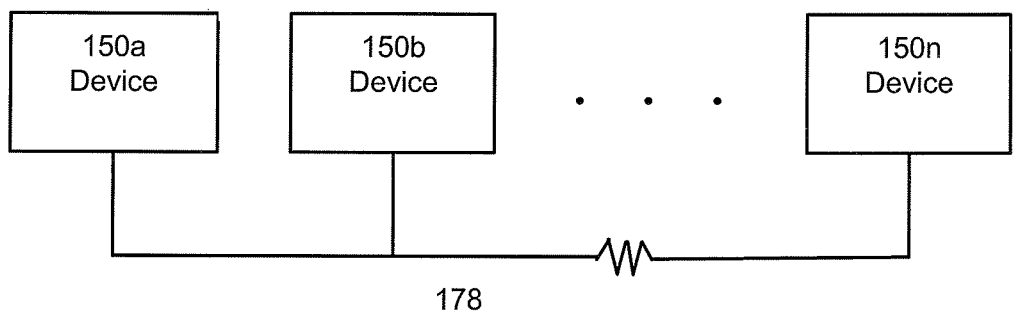
Figure 4:
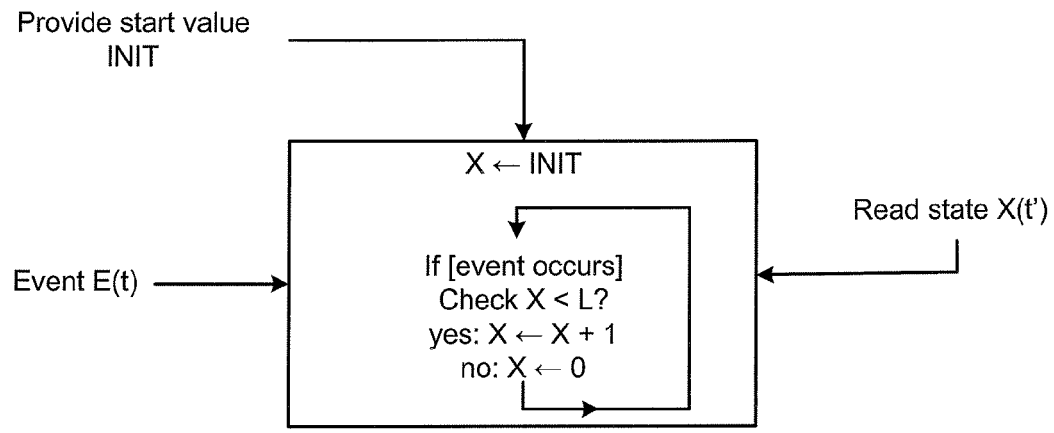
FIG. 4 illustrates an embodiment of a state module in accordance with an embodiment of the present invention.

FIG. 3b illustrates a schematic of a system that includes n number of devices 150a-150n that can communicate via link 178. In an embodiment, device 150a could include a plurality of the state modules such as described with respect to FIG. 4. Signals received from devices 150b-150n could be used to increment the state modules in a desired manner. In an alternative embodiment, a separate state module, the details of which are discussed below, could be located on a single device and the combination of state modules on a number of devices could be used to form the set of state modules that make up the random number generator. In alternative embodiments, more than one state module could be provided on some of the devices while other devices could create events that cause one or more state modules to increment. Thus, as can be appreciated, a large number of variations are possible, depending on the desired system configuration.

In some embodiments, a system schematically represented by FIG. 3b might be contained within a single housing, such as housing 20. In other embodiments, the devices 150a-150n could all be located remotely from each other in different housings. Variations and combinations of these two possibilities are also contemplated. In addition, different devices could communicate in different ways, such as a variety of protocols and or mediums, depending on the system configuration. Thus, the link 178 is a logical representation rather than a physical representation.

State Module

Repeatable computing modules have the advantage of being easily used in parallel computing systems, which is advantageous for situations where it is easier to use more processes than it is to process a single stream faster. Consider a presettable hardware or software event counter whose state is represented by X and operates per the pseudocode shown in FIG. 4. As each event E(t) occurs, the state of X is incremented by one until a value of L−1 is reached, at which point the counter resets to zero on the next event. Such a counter will continuously cycle through L values of the state variable, X and thus is an example of a state module that can be incremented through L values. If the value of X is read at times t' that are statistically independent of the events E(t) and are much less frequent than events E(t), then X will behave as a random variable with uniform probability distribution. This means that on a given read of X, any value from 0 to L−1 is equally likely. Note that such a state module may consume only a few lines of assembly code and storage locations for X and the constant L. In an embodiment, very simple assembly commands using registers that can be incremented can be used to implement the state module easily. It should be noted that as used herein, the term increment is meant to include positive and negative changes in value unless otherwise noted. It should further be noted that the value used to increment is not limited to a particular number but instead may be set as desired and may be changed as desired.

Figure 5:
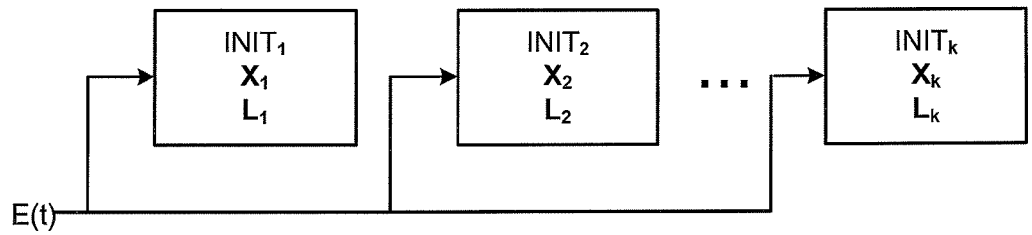
FIG. 5 illustrates a set of state modules in accordance with an embodiment of the present invention.

While one state module would have some value, its period would be short and the results somewhat predictable. Therefore, a "knapsack" of k such state modules may be formed, each with distinct limit values $L_1, L_2, \ldots, L_k$. This is shown in FIG. 5. This set of state modules will form a PRNG. It should be noted that the set of k state modules can be two or more, thus an embodiment could include two state modules. As discussed below, however, certain statistical properties can be somewhat improved if the number of state modules used is increased. In an embodiment the limit values $L_i$ are selected such that all of the values are pairwise relatively prime. That is, for any i not equal to j, $L_i$ has no common factors with $L_j$ that are greater than one. The state of the generator is represented by the set of values $X_1, X_2, \ldots, X_k$. The Chinese Remainder Theorem guarantees that as the events E(t) occur, the generator must go through a distinct number of states equal to the product of all the limits $L_i$. This set of state modules, which may also be referred to as a knapsack of prime event counters ("KOPEC"), acts as a PRNG and may also be referred to as a KOPEC generator. If the number of states are defined to be $N_s$, then:

$$N_S = \prod_{i=1}^{k} L_i$$

This means that the PRNG will move through $N_s$ distinct states before repeating. Each of the values $X_i$ may be viewed as a remainder modulo $L_i$, and the state of all the $X_i$ as a congruence. The Chinese Remainder Theorem dictates that each of these congruences is unique modulo $N_s$. For the PRNG, $N_s$ is referred to as the period of the generator. Even for modest values of L such as may be represented in eight bits, the period can be very large as the number of state modules, k, increases.

The values of the k state modules can then be combined to provide an output random number be using a desirable function of the states $X_i$. A function simple to implement in very small processors is a straight sum:

Let generator output $$O = \sum_{i=1}^{k} X_i$$

This will produce random numbers between zero and $$S = \sum_{i=1}^{k} L_i.$$

If the processor can only handle a word size w, and the desire is for a w-bit random number, the addition can be performed relatively efficiently:

Let generator output $$O = \sum_{i=1}^{k} X_i [\text{mod } 2^W]$$

For an 8-bit processor, for example, all the $X_i$ could be summed modulo 256 (modulo $2^w$ where w equals 8). As 8-bit processors are relatively common, using w equals 8 potentially allows for a large install base. By increasing the number of state modules k, a greater number of random values are combined. By the central limit theorem, the sum of the random values begins to converge to a normal distribution around a mean of S/2, S having been defined above. However, taking the sum modulo $2^w$ will fold tails of such a normal distribution into the interval (0, $2^w-1$), and tend to make the distribution more uniform. Therefore, increasing the number of state modules will tend to increase the period while preserving the statistical unpredictability of receiving a particular number.

While the output random number can be taken to be any function of the states $X_i$, using sum module $2^w$ is an economical method to obtain an acceptable level of statistical distribution of the outputted random number. If the instruction set allows, an output function XOR of all the state bytes, although more costly computationally, will typically be observed to produce better statistics of the generated bitstream for a given size of knapsack. As can be appreciated, however, other functions to combine the results may be used. Increasingly sophisticated output functions, such as those discussed below, may be used as warranted by the application and the computing resources available.

Multiple Event Streams

Figure 6:
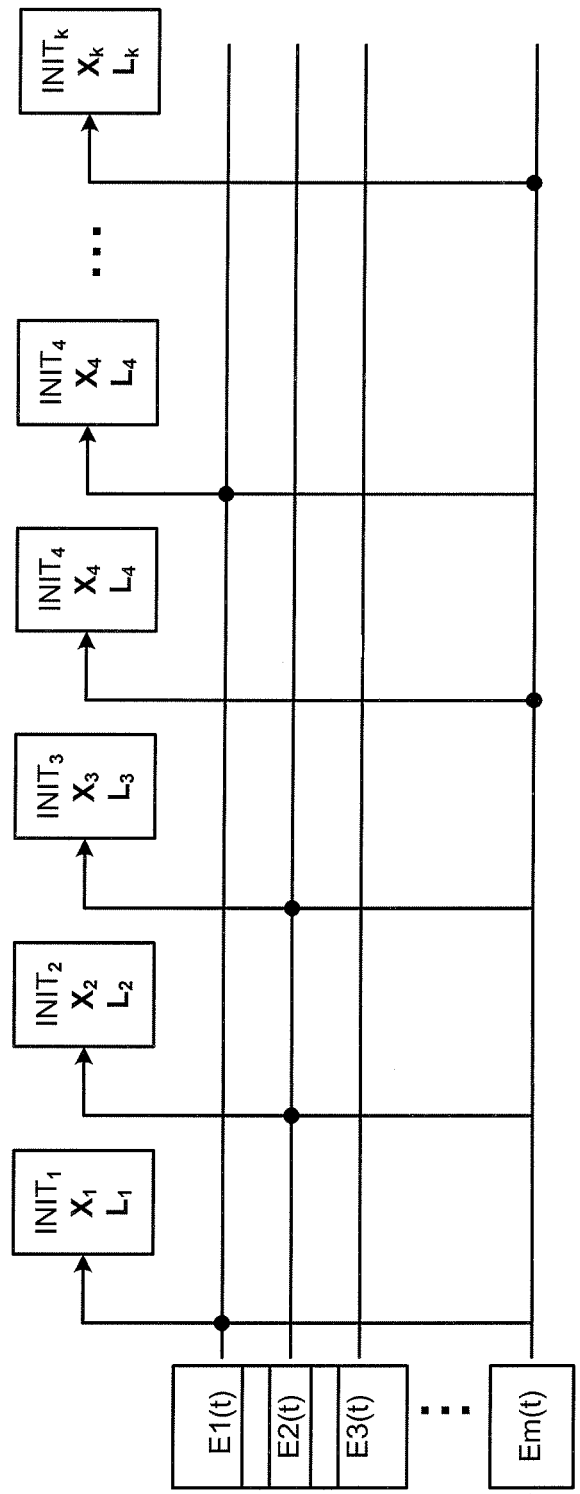
FIG. 6 illustrates a matrix of state modules in accordance with an embodiment of the present invention.

The structure of FIG. 5 may be enhanced by the availability other independent events to count, and/or by availability of slightly more computing power, such as combining the states of the state modules with the bytewise XOR function. One method of increasing the randomness is to have different events increment different state machines. FIG. 6 shows a possible matrix arrangement where each state module is connected to only one event stream, but may be easily reconfigured to connect to any one of them. As can be appreciated, in an embodiment more than one event could be used to increment a particular state module As can be appreciated, the matrix of FIG. 6 is similar to m KOPEC PRNGs running in parallel, wherein the set of modules attached to a given event stream E1(t) through Em(t) each forms an independent KOPEC generator such as shown in FIG. 5. The outputs of each "subgenerator" may be combined by some function to produce the overall generator output. Again, the simplest such function is to add modulo $2^w$. Such a function is well suited for processors that cannot do more complex functions, such as XOR. However, statistical properties may be more desirable by XORing the subtotal outputs of each subgenerator. While combining outputs driven by different event streams may add entropy to the system and enhance randomness, it also makes the system more chaotic and complicates analysis (and also increases the complexity of the system). While the event stream may be any desirable event, the following are examples, without limitation, of event streams that may be used:

- watchdog timer placation or RC one-shot expiration
- processor clock edge or program counter tick
- local request to transmit a packet [as opposed to received packet—it is usually undesirable from a network security viewpoint to allow triggering by any event produced by other nodes]
- A/D converter produces a word with a given value
- state value ready bit, reading from FLASH
- state value ready, on read from disk
- operating system "tick" of a given process priority
- system reboot counter The knapsack of state modules may distribute the storage of state variables across multiple media, and perhaps across multiple software processes in order to enhance properties for some applications. For instance, running state modules at differing process priorities under an operating system [if sufficient resources exist to have an operating system] will introduce dependence on other tasks being executed and will add entropy.

In addition, the matrix depicted in FIG. 6 can be reconfigured in response to one or more inputs. For example, one of the event streams noted above could be used to successively reconfigure the matrix in FIG. 6. One very useful event might be rebooting of the system. If a nonvolatile count of the number of reboots is maintained (e.g., the count is incremented during a boot routine), the number of reboots can be used to determine the configuration of the state machines and/or to derive the INIT values of the state machines. In this way, the generator will have different properties (or be at a different starting state) on successive reboots. More will be said about reconfiguring the state machine below.

Centering the Distribution Mean at Zero, mod $2^w$

Figure 7:
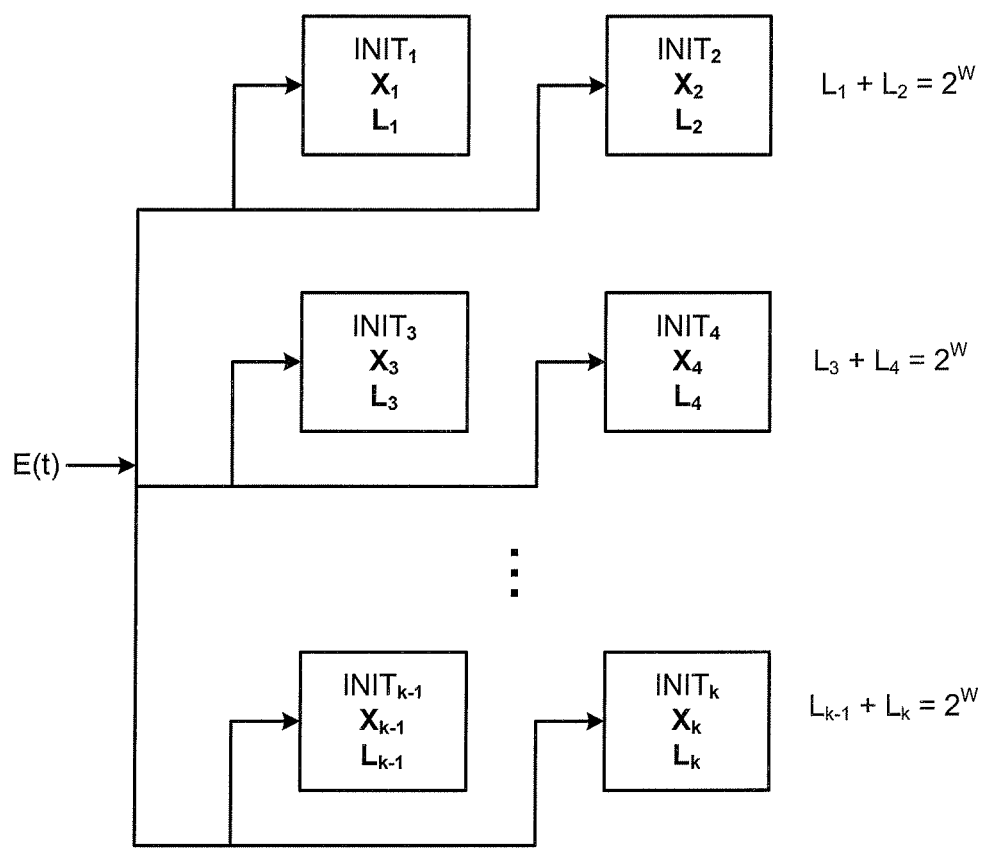
FIG. 7 illustrates a set of state modules in accordance with another embodiment of the present invention.

FIG. 7 shows a method of balancing the relative frequency of each possible random output value, which will work for some values of $2^w$. In an embodiment, a relatively prime set of $L_i$ values may chosen so that pairs of L sum to $2^w$. The accepted portion of Godbach's conjecture indicates that the probability of at least one such pair is arbitrarily close to 1, however, it turns out there are many such pairs for w=8. The advantage of doing this is that it has the effect of making S approximately a multiple of $2^w$. If a number k is chosen such that S is an even multiple of $2^w$, it will place the peak of the probability distribution, occurring at S/2, at a value close to zero, modulo $2^w$. Doing this, assuming a symmetrical distribution around S/2, will cause a more uniform distribution of probabilities when the output function is a sum taken modulo $2^w$.

Generalized State Assignment

Figure 8:
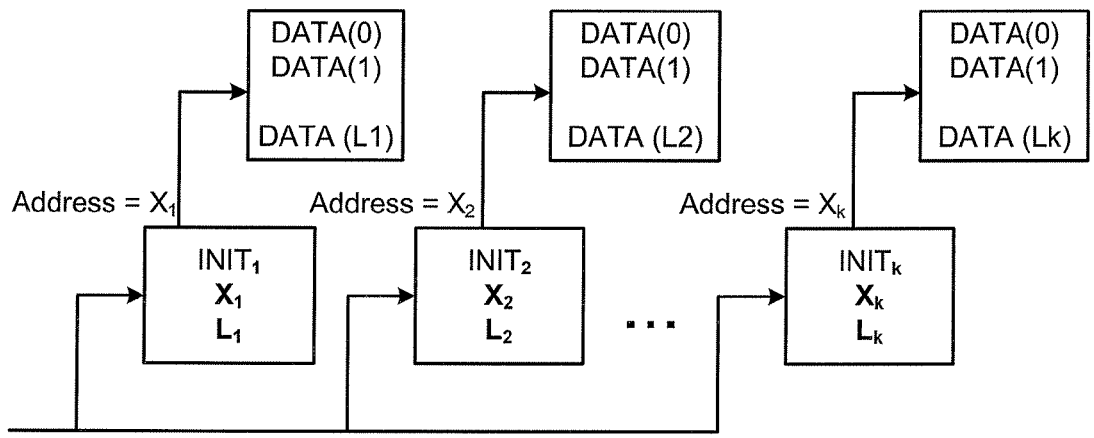
FIG. 8 illustrates a set of state modules in accordance with another embodiment of the present invention.

In another embodiment, tailoring of the statistical properties of the generator may be exercised at the expense of more storage. Each of the state variables $X_i$ can be viewed as a pointer to a lookup table of values. These values, and the output function of them, may be chosen to optimize statistical properties for a given application. In other words, the value of the state module is used to point to either another value or a location that will lead, through one or more steps, to another value, which is then used to generate a random value. More exotic output functions such as hashing functions can be considered as more computing resources are available. Such a generalized arrangement is depicted in FIG. 8.

Figure 9:
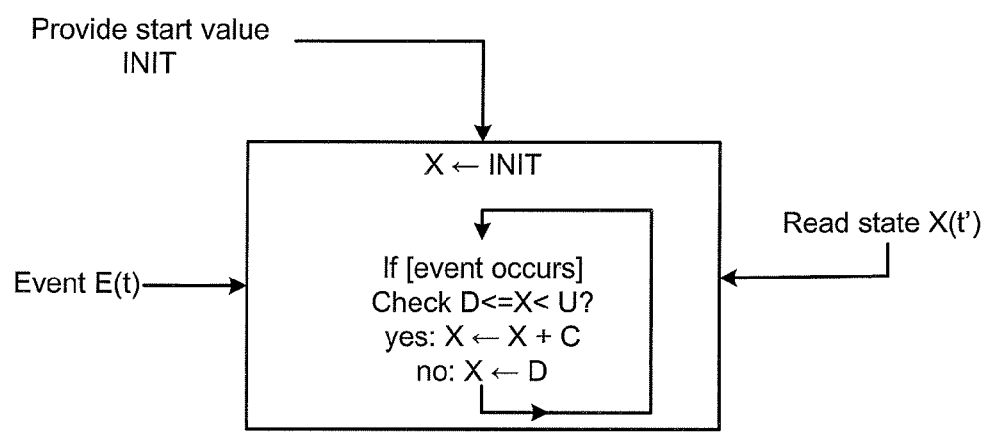
FIG. 9 illustrates another embodiment of a state module in accordance with an embodiment of the present invention.

A compromise in complexity that does not require a full lookup table of storage is to use a few constants to distribute state assignment differently. This will change the apparent run lengths of "predictable" sequences, since incrementing k state modules always by one, and using a sum as the output function, may produce sequences of output which differ by k. This may not be important for backoff or address assignment but will be for other applications. One such compromise type state module is shown in FIG. 9. It should be noted that for the parameterized state module depicted in FIG. 9, the values for C, D and U must be chosen so that L states occur.

Figure 10:
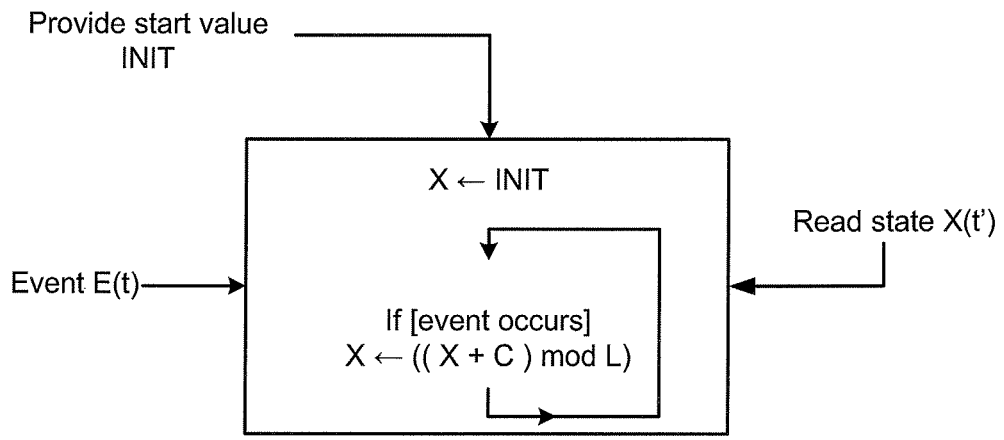
FIG. 10 illustrates another embodiment of a state module in accordance with an embodiment of the present invention.

On a processor where modular arithmetic is available, the parameterized state module of FIG. 9 becomes simpler, as illustrated in FIG. 10. In an embodiment where the state module increment parameter C is chosen to be coprime with L, another variation in the state assignment of state module X is obtained with comparatively little processing cost.

Cascaded State Modules

Figure 11:
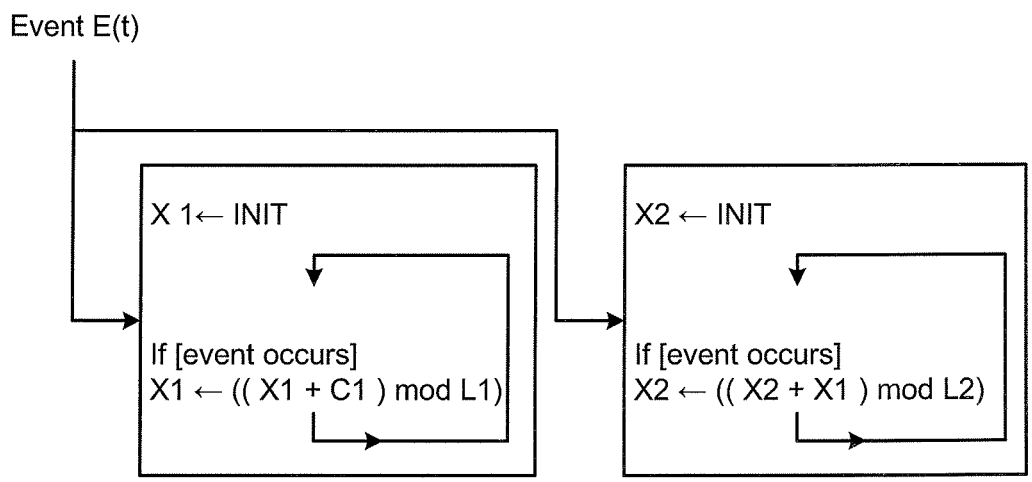
FIG. 11 illustrates a set of cascading state modules in accordance with another embodiment of the present invention.

In an embodiment, a "cascaded" KOPEC generator where one generator with properly chosen parameters uses its state variables as the knapsack of increments, notated as {C}, for another. Two state module elements with this relationship are illustrated in FIG. 11. As can be appreciated, the value of X1 is used to increment the value of X2 for each event. This technique may be extended to a "chain" of cascaded state modules. Thus, a chain of state modules could be used, each subsequent state machine depending on the state of prior state machine for its increment value. As discussed below, it has been found, somewhat surprisingly, that a relatively short chain of cascaded state machines can provide good statistical results. It should be noted that variations in the cascading function are envisioned. In an embodiment, multiple branches could emanate from a single state machine. In another embodiment, several shorter chains could be used together.

In an embodiment where the sum of increments presented by the "feeding" state module [designed to be $L_1$ distinct values] is coprime with the length $L_2$ of the "receiving" state module, the receiving state module states $X_2$ are observed to go through a sequence of length $(L_1)(L_2)$. If the increments are all the values 0, 1, 2, . . . , $L_1$, then the sum of all the increments is given by $((L_1-1)(L_1-2))/2$. The sum will have the factor $L_1-1$, so it is preferable to avoid using $L_2=L_1-1$ in a cascade in this case. $L_2=L_1-2$ would not be coprime in any case with $L_1$ due to the common factor of 2. Preferably care should be taken to preserve the period length if multiple event streams are being counted by different stages in the cascade. This is because the $X_2$ value may possibly be used as a state module increment for multiple $X_1$ events, and not all $X_2$ may be coprime with $L_1$. In this case, it may be better to have all $L_1$ to be strictly prime. The continual changing of increment values has the effect of improving the randomness statistics. It has been observed that a cascaded generator provides the best performance on randomness tests for the fewest processor resources [constants to store], assuming that modulo $L_i$ arithmetic can be performed.

Event Blocking or Synthesis

Figure 12:
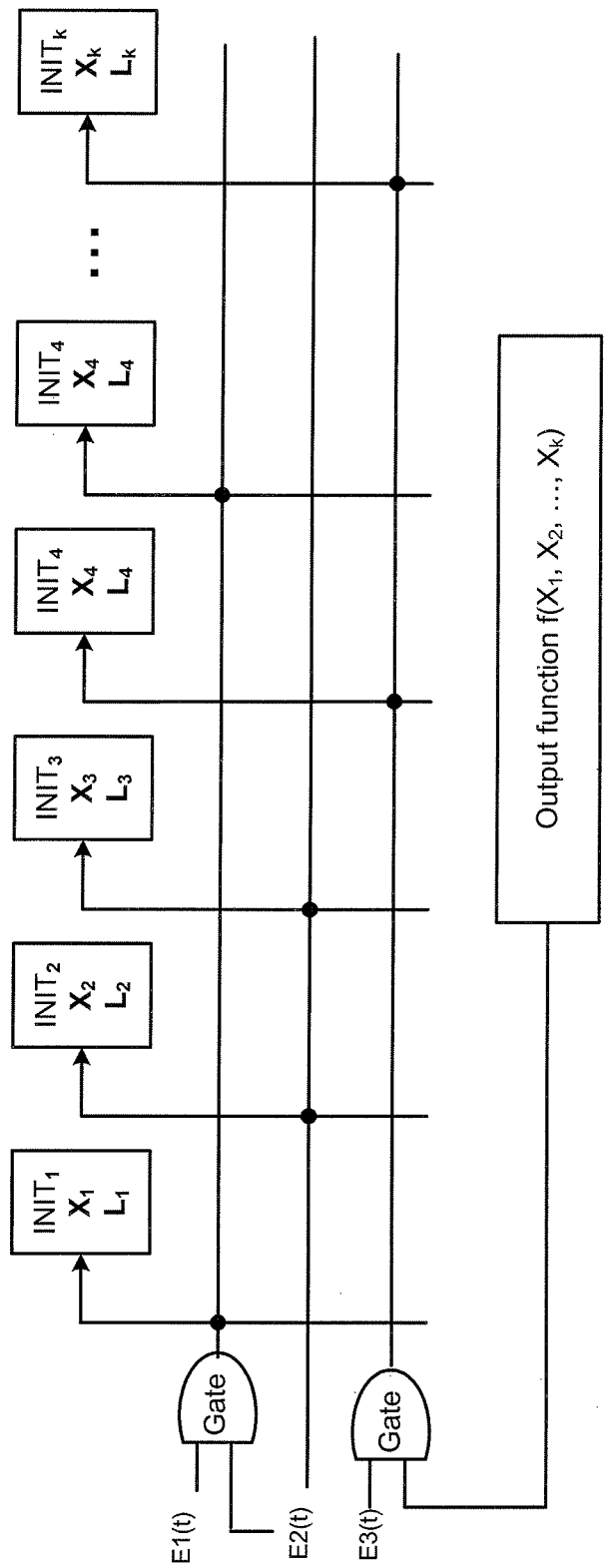
FIG. 12 illustrates a matrix of state modules with some of the events gated by other events in accordance with an embodiment of the present invention.

In some applications, depending on the nature of the event streams, it may be beneficial to obscure the nature of the generator to an outside observer by allowing one event stream to be gated (e.g., blocked) by another, or by an output function as illustrated in FIG. 12. Preferably the configuration will be chosen with care so as not to permit any states to exist where all events are blocked. Since the outputs of the gate functions may themselves be viewed as events "synthesized" from other events, the arrangement of FIG. 12 is substantially the same as that of FIG. 6. It should be noted that other variations are possible. For example, multiple events such as $E1(t)$ and $E2(t)$ could cause increments in one or more of the state machines while $E1(t)$ was the only event that caused increments in other state machines.

Knapsack Updating

Figure 13:
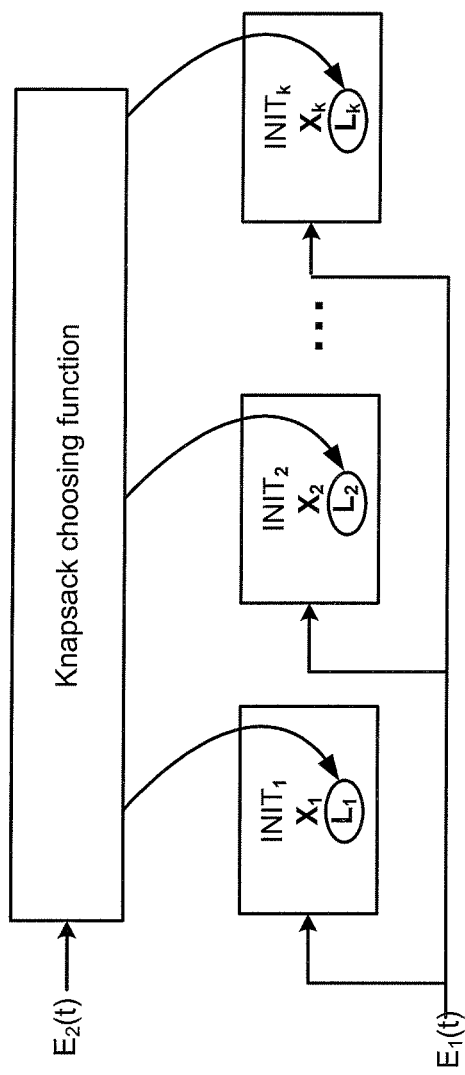
FIG. 13 illustrates an embodiment of a set of state modules with selectable limits in accordance with an embodiment of the present invention.

As noted above, it may be beneficial to adjust the configuration of the state machines. One method could be to adjust the configuration on reboot of the system. Another method could be to adjust the configuration after a period of time or in response to some other input besides reboot. FIG. 13 illustrates an embodiment that allows the configuration to be adjusted and that utilizes increased computing resources and multiple event streams as compared to the embodiment depicted in FIG. 5. A function can be provided that can select from multiple knapsacks {L} that have k pairwise coprime factors in each knapsack. In an embodiment the various knapsacks could be stored table, although a more sophisticated choosing algorithm could be used if desired. A second event stream $E_2$, presumably with events much less frequent than $E_1$, might be used to load a new set of L values into the generator. As can be appreciated this again would make it harder for an outside observer to determine generator properties. In general, other PRNGs or functions might be used to select values for {L}.

Any of the techniques in FIGS. 4-13 may be brought to bear in a given KOPEC instance. Since the computing power or logic requirements are determined by the word size w and the number of state modules k, the notation KOPEC (k,w) can serve to indicate the particular architecture. The total number of state bits is given by kw, but note that the entire state space cannot be used due to the need for all the state module lengths to be pairwise coprime. The rest of a given KOPEC generator is defined by the knapsack of state module lengths, and the state assignments [if a cascade] or a second knapsack of state module increments. If state modules are arranged in cascade, it is proposed the notation (k,w)→(k,w) show that state information from the first KOPEC is being used as increments for the second. Chains of more than two generators may also be represented this way. If a single state module is cascaded feeding an entire chain of k state modules, it is further proposed to show this as $(1,w)^{\rightarrow k}$. In an embodiment it may be beneficial for an application to operate state modules of arbitrary word sizes and assemble them into the desired lengths.

Such an approach may be beneficial to obtain sufficient entropy without requiring a larger memory size on processors with longer word lengths.

An Example

Figure 14:
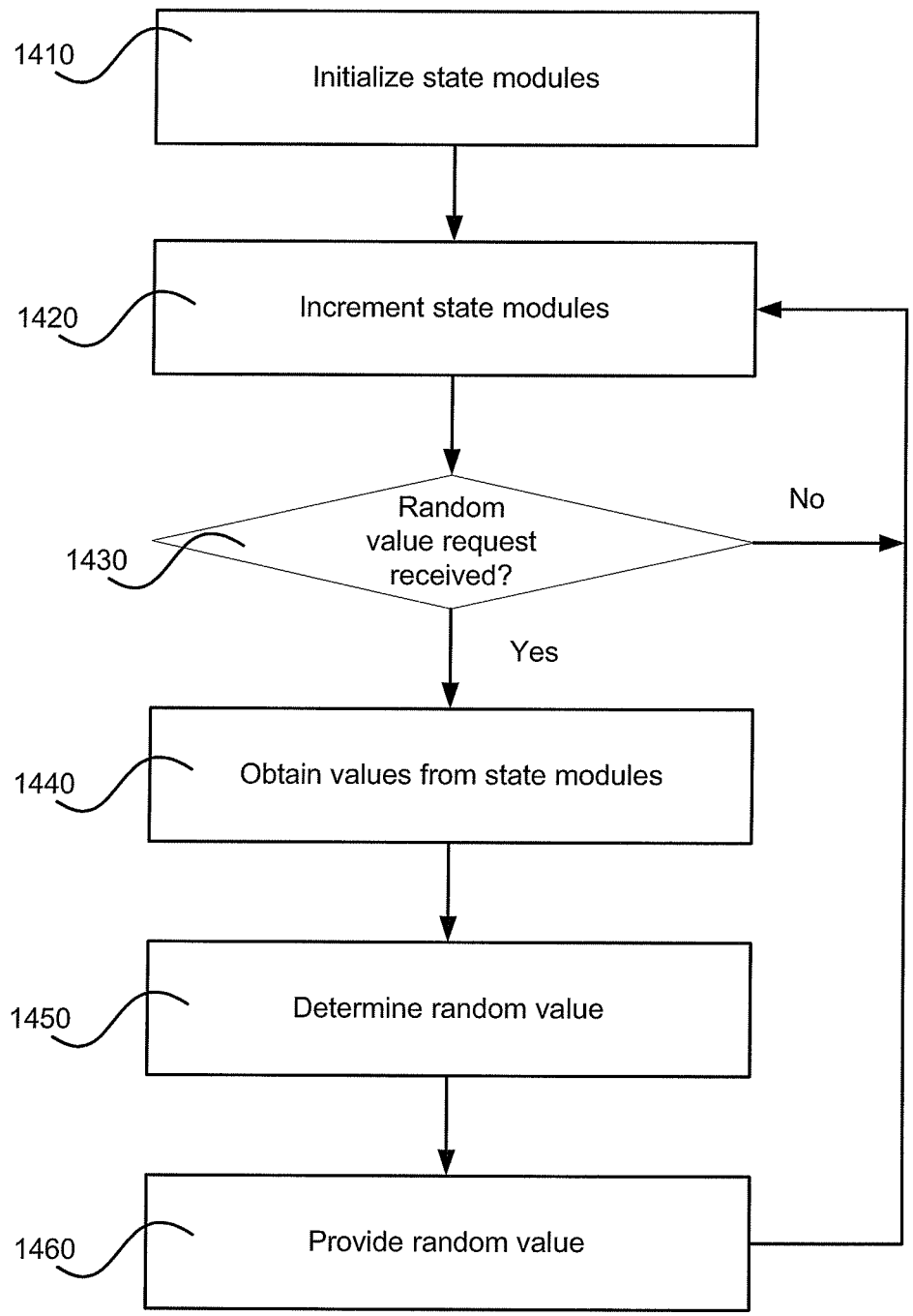
FIG. 14 illustrates a method for obtaining a random number in accordance with at least one aspect of the present invention.

FIG. 14 illustrates a representative set of steps that may be used to generate a random number. First, in step 1410 the set of state modules are initiated. This may include selecting the limits for each state module if the limits are adjustable as well as selecting the incrementing values for each state module. Furthermore, this may include determining which, if any, of the state machines incrementing values depend on another state machine (e.g., there is a cascaded arrangement). In an embodiment the state machines may be combined mod $2^w$ where w=8, thus the upper limit is 255 and the length L of each of the states of the state modules can be up to 256. The total number of state modules k is set equal to four and the knapsack of state module lengths {L} is {256, 127, 179, 101}.

In an embodiment, the INIT value for each state module $X_i$ is i−1. Also, the 256 state module is as shown in FIG. 6 without the limit check and $C_1$=85. This means, for the first state variable $X_1$, the next state will always be given by ($X_1$+85) mod 256. This state module will then necessarily cycle through all 256 8-bit values since 85=5×17 is relatively prime to 256=$2^8$. For the rest of the state modules, using a cascade as shown in FIG. 11 makes the increment $C_i$ for a given $X_i$ equal to $X_{i-1}$, for i=2, 3, and 4. To conserve computing cycles, the output function will be sum, modulo 256.

In step 1420, the values for each state module are incremented. As shown below in the table of results, state module $X_1$ is incremented by 85 each time, while $X_2$ is incremented by the previous value of $X_1$, $X_3$ is incremented by the previous value of $X_2$, and so on. Thus, while a simple incrementing of each of the state machines by one may be suitable, more complex incrementing methods also provides suitable results.

In step 1430, a check is made to see there is a request for a random value. Alternatively, a request for a random value could interrupt the cycling. If the answer is no, then step 1420 is repeated. As can be seen from the table below, for a PRNG configured as described, the state values are shown for the first 14 events.

If a random number is desired, then in step 1440, the values of each of the state modules are obtained. Then in step 1450, the values are combined sum mod 256. As can be appreciated, the values may be combined with other functions as desired, including but not limited to XOR. Then in step 1460, the random value is provided.

However, if the above example is used, the follow excerpt from the sequence of state variables [shown as decimal integers] starting from an arbitrary initialization point ($X_1$=0, $X_2$=1, $X_3$=2, $X_4$=3) and the corresponding outputs after each counted event E(t) would then be:

Table of Results

| Event Count E(t) | $X_1$ ($L_1$ = 256) ($C_1$ = 85) | $X_2$ ($L_2$ = 127) ($C_2$ = $X_1$) | $X_3$ ($L_3$ = 179) ($C_3$ = $X_2$) | $X_4$ ($L_4$ = 101) ($C_4$ = $X_3$) | Output Σ mod 256 |
|---|---|---|---|---|---|
| 0 | 0 | 1 | 2 | 3 | 6 |
| 1 | 85 | 1 | 3 | 5 | 94 |
| 2 | 170 | 86 | 4 | 8 | 12 |
| 3 | 255 | 2 | 90 | 12 | 103 |
| 4 | 84 | 3 | 92 | 1 | 180 |
| 5 | 169 | 87 | 95 | 93 | 188 |
| 6 | 254 | 2 | 3 | 87 | 90 |
| 7 | 83 | 2 | 5 | 90 | 180 |
| 8 | 168 | 85 | 7 | 95 | 99 |
| 9 | 253 | 126 | 92 | 1 | 216 |
| 10 | 82 | 125 | 39 | 93 | 83 |
| 11 | 167 | 80 | 164 | 31 | 186 |
| 12 | 252 | 120 | 65 | 94 | 19 |
| 13 | 81 | 118 | 6 | 58 | 7 |
| 14 | 166 | 72 | 102 | 64 | 170 |

The knapsack of state module limit values 256, 127, 179, and 101 are pairwise coprime. The total number of states in the generator [$N_s$] becomes the product of all the limits, (256)(127)(179)(101)=587784448. This is about 29 bits of entropy. In the cascade, one can observe that the period of state module $X_1$ is 256, while that of the $X_2$ state module is (256)(127)=32513, and that of the $X_3$ state module is (256)(127)(179)=5819648. In fact the state module $X_4$ has a period as long as the full generator before repeating, and if our purpose were to have random numbers modulo 101, its state could be used directly as a full-period output. Since all the state modules work in parallel, the output bitrate of this generator should be very good even on small 8-bit processors since it can produce a new output at least every few program state module cycles. [If sufficient entropy was desired to fill out, say, IPv6 address space, additional state modules could be added until there were at least $2^{128}$, or about $10^{38}$ states. Since there are 54 prime numbers less than 256, this is a possibility. However, in an embodiment the state variables can be used directly as the generated address if 16 state modules of eight bits each, of pairwise coprime lengths are used, assuming that filling the entire address space is not required. Such a state module is studied statistically as example E in the next section.] The resources that may be used by the KOPEC $(1,8)^{\rightarrow 4}$ cascade generator example described above are: program memory of 5 constants for the 4 values in {L} plus one in {C}.

It should be noted that while the table provided above represents a cascaded arrangement, other variations are readily formed. For example, different events could be used to increment the different state modules and each state module might have an increment other than 1. In an embodiment, the system of FIG. 3 could be configured so that the PLCs 152, 153 each include at least state modules and the state modules are incremented in response to an event provided to the respective PLCs. The PC 154 would obtain the values of the various state modules and then combine the values with a desired function so as to generate a random number that the PC could then use or transmit. Alternative, the PC 154 could transmit the values to another device. Other variations are also contemplated.

Statistical Performance

Ten different KOPEC (k,8) generators were implemented as C-language programs, showing the effect of varying the number of state modules k, the knapsacks of state module lengths {L} and state module increments {C}, cascading, as well as use of two output functions. Between $10^7$ and $10^9$ cycles of the generator were simulated and the outputs examined using ENT, a program examining 8-bit byte level statistics. Two measures of uniformity in the frequency distribution of the outputs were also recorded: the tightness of the distributions (σ/μ) across the 255 possible output values and also across the 65536 possible output $O_i$ $O_{i+1}$ transitions. Table I defines the ten generators in terms of the number of event state modules, the knapsack of state module lengths{L}, and the knapsack of increments {C} assuming modulo L operation and state assignment of each state module per FIG. 10 and/or FIG. 11.

TABLE I

Definition of Sample PRNG parameters

| PRNG | KOPEC Identifier (k, w) | Knapsack of Lengths {L} | Knapsack of Increments {C} | Approximate $Log_2$ of period |
|---|---|---|---|---|
| A | (7, 8) | {17, 23, 29, 229, 233, 239, 256} | {1, 1, 1, 1, 1, 1, 85} | 45 |
| B | (7, 8) | {17, 23, 29, 229, 233, 239, 256} | {3, 5, 7, 11, 37, 47, 85} | 45 |
| C | (3, 8)→ (3, 8)→ (1, 8) | {256, 179, 85}→ {127, 197, 101}→ {211} | {85, 7, 31}→ | 51 |
| D | $(1, 8)^{\rightarrow 7}$ | {256}→ {85, 179, 127, 101, 197, 211} | {85}→ | 49 |
| E | (16, 8) | {193, 197, 199, 211, 217, 223, 227, 229, 233, 239, 241, 247, 251, 253, 255, 256} | {37, 41, 43, 3, 5, 7, 11, 13, 17, 19, 23, 29, 31, 47, 53, 59} | 125 |
| F | (16, 8) | {5, 11, 19, 31, 43, 59, 73, 83, 103, 131, 149, 191, 199, 227, 229, 256} | {2, 5, 11, 12, 4, 23, 8, 2, 20, 67, 83, 97, 64, 43, 53, 85} | 99 |
| G | (49, 8) | {3, 5, 7, 11, 13, 17, 19, 23, 29, 31, 37, 41, 43, 47, 53, 59, 61, 67, 71, 73, 79, 83, 89, 97, 101, 103, 107, 109, 113, 127, 131, 137, 139, 149, 179, 181, 191, 193, 197, 199, 211, 223, 227, 229, 233, 239, 241, 251, 256} | {1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1} | 300 |

TABLE I-continued

Definition of Sample PRNG parameters

| PRNG | KOPEC Identifier (k, w) | Knapsack of Lengths {L} | Knapsack of Increments {C} | Approximate $Log_2$ of period |
|---|---|---|---|---|
| | | 229, 233, 239, 241, 251, 256} | 1, 1, 1, 1, 1, 1} | |
| H | (33, 8) | {3, 5, 11, 13, 19, 23, 31, 37, 43, 47, 59, 61, 71, 73, 83, 89, 101, 103, 109, 113, 131, 137, 149, 179, 191, 193, 199, 211, 227, 229, 239, 241, 256} | {1, 2, 5, 7, 11, 13, 12, 32, 4, 15, 23, 29, 53, 8, 2, 1, 28, 20, 66, 13, 67, 71, 83, 128, 97, 27, 64, 37, 43, 53, 2, 17, 85} | 204 |
| I | (21, 8) | {3, 5, 11, 19, 31, 43, 47, 59, 73, 83, 101, 103, 131, 137, 149, 191, 199, 211, 227, 229, 239, 256} | {1, 2, 5, 11, 12, 4, 15, 23, 8, 2, 28, 20, 67, 71, 83, 97, 64, 37, 43, 53, 2, 85} | 128 |
| J | $(1, 16)^{\rightarrow 46}$ | {3, 5, 7, 11, 13, 17, 19, 23, 29, 41, 53, 61, 79, 97, 113, 149, 181, 227, 281, 349, 433, 541, 661, 827, 1021, 1277, 1571, 1951, 2417, 3001, 3719, 4621, 5717, 7103, 8803, 10909, 13537, 16787, 20809, 25793, 31991, 39659, 49193, 61001, 65521, 65536} | {1}→ | 436 |

Each of the ten PRNGs were used with two output functions, one the sum mod 256, and the other XOR of all the state bytes X. The C programs were executed on a PC and between $10^7$ and $10^9$ 8-bit bytes of output directed into files which were examined by ENT. P-values between 0.1 were 0.9 are given the "OK" designator. A summary of the results are shown in Tables II. Source code used for generator D is listed in Appendix I.

TABLE II

Statistical Test Results, 8-bit ENT [4]

| PRNG | Output function | Entropy bits/byte | Compressibility by Liv-Zempel | Arithmetic mean | Chi-square p-value | Monte Carlo Value for pi error | Serial Correlation Coefficient |
|---|---|---|---|---|---|---|---|
| A | Σ mod 256 | 7.999999 | 0.00% | 127.5551 | 0.9999 | 1.69% | −0.3995 |
| A | XOR | 7.999998 | 0.00% | 127.4265 | 0.0250 | 3.86% | −0.3578 |
| B | Σ mod 256 | 7.999999 | 0.00% | 127.5548 | 0.9999 | 3.23% | 0.1010 |
| B | XOR | 7.999997 | 0.00% | 127.4283 | 0.2500 | 0.02% | −0.01461 |
| C | Σ mod 256 | 7.999999 | 0.00% | 127.5003 | 0.5000 | 0.06% | 0.006503 |
| C | XOR | 7.999998 | 0.00% | 127.4962 | 0.0250 | 0.11% | 0.000095 |
| D | Σ mod 256 | 7.999998 | 0.00% | 127.5007 | 0.2500 | 0.00% | 0.02142 |
| D | XOR | 7.999999 | 0.00% | 127.4977 | 0.5000 | 0.01% | −0.00688 |
| E | Σ mod 256 | 8.000000 | 0.00% | 127.4996 | 0.9999 | 0.30% | 0.2313 |
| E | XOR | 7.999997 | 0.00% | 127.5005 | 0.7500 | 0.00% | 0.000071 |
| F | Σ mod 256 | 7.999999 | 0.00% | 127.4919 | 0.9999 | 0.01% | 0.000800 |
| F | XOR | 7.999998 | 0.00% | 127.5138 | 0.5000 | 0.30% | −0.000467 |

TABLE II-continued

Statistical Test Results, 8-bit ENT [4]

| PRNG | Output function | Entropy bits/byte | Compressibility by Liv-Zempel | Arithmetic mean | Chi-square p-value | Monte Carlo Value for pi error | Serial Correlation Coefficient |
|---|---|---|---|---|---|---|---|
| G | Σ mod 256 | 7.999996 | 0.00% | 127.4953 | 0.1000 | 0.88% | 0.2298 |
| G | XOR | 7.999998 | 0.00% | 127.4946 | 0.9000 | 4.99% | 0.5790 |
| H | Σ mod 256 | 7.999997 | 0.00% | 127.4978 | 0.5000 | 0.01% | −0.000074 |
| H | XOR | 7.999999 | 0.00% | 127.4923 | 0.1000 | 0.01% | 0.000019 |
| I | Σ mod 256 | 7.999999 | 0.00% | 127.5005 | 0.9999 | 0.03% | 0.000831 |
| I | XOR | 7.999997 | 0.00% | 127.5035 | 0.5000 | 0.21% | 0.000058 |
| J | Σ mod 65536 | 7.999997 | 0.00% | 127.4752 | 0.5000 | 0.02% | 0.000028 |
| J | XOR | 7.999997 | 0.00% | 127.4974 | 0.5000 | 0.28% | −0.000249 |

First, relative to the ENT results, it can be seen by comparing generators A and B that a diverse knapsack of increments {C} is helpful with serial correlation, and also the overall statistics. Even some of the smaller generators (e.g. B) produce Chi-square results [ENT calculates this on the full output file] comparable in performance to physical processes or common system generators. Changing the output function to XOR improves the results, especially dramatic in the case of the large generator G which has a trivial {C}. Generator H has the best overall performance of these examples, using constants for increments, with both output functions.

An overall surprise is that a small 8-bit processor using a few constants and memory locations can produce results that seem to be quite useable for many applications. Most notable is the performance of the cascaded arrangement, [generators C, D] which can, with only seven 8-bit state modules, produce very good results.

Choice of Knapsacks

The knapsack of state module lengths, [let us notate it as {L}], can be chosen once the number of state modules k and word size w are determined, usually based on processor resources for program and constant storage and the number of instructions available per unit time for the generator, i.e. desired performance. Once these parameters are selected then k pairwise coprime factors are chosen for the knapsack. In an embodiment the set of primes less than $2^w$ may be used. By the Prime Number Theorem, the number of such primes, is given by the counting function π(n) evaluated at n=$2^w$, which for w of 16 or greater has a fairly close lower bound of $2^w$/w ln 2. For w=8, π(256)=54. If desired, the powers of primes less than or equal to 256, $2^8, 2^7, 2^6, 2^5, 2^4, 2^3, 2^2, 3^5, 3^4, 3^3, 3^2, 5^3, 5^2, 7^2, 11^2, 13^2$ can also be added. This provides a set of a total of 70 numbers to combine, as desired, to make the knapsack. A selection is made of an individual factor, a pair, a triple—any subset of these 70 numbers whose product is 256 or smaller—and the product of the subset is made a first knapsack member. The next knapsack member is chosen so that there are no factors in common with the first, and so on until k pairwise coprime members for {L} have been selected. If a list of all the prime powers less than $2^w$ were available, a sieve algorithm would allow the selection of subsequent factors so that it is pairwise coprime with all previous choices. It should be noted that the number of possible knapsacks can become quite large.

The knapsack of state module increments {C} has even more possibilities. Here, $C_i$<$L_i$ need only be coprime with its respective $L_i$, and less than $2^w$. Therefore, while the number of C values may be chosen, like the L values, for a given state module, they may be any number prime or composite which does not have factors in common with L, and may even be repeated in different state modules. Other patterns of "good" choices for w=8 state modules at this point come from empirical observations:

- better statistics, but shorter periods, will be found when the knapsack of L values are spread between 3 and 256 [e.g. compare generators E and F]. To get good statistics and long periods, k must be increased.
- better statistics will be obtained when there are a variety of distinct values in {C}, some of which are different powers of 2. [Note that using a power of 2 for the increment manipulates one bit position in the state module's binary state representation.]
- for a cascaded state module arrangement, paired as in FIG. 8, having all values in {L} strictly prime insures the full period. For counting a single event stream, a cascaded state module will provide the best statistics for given computing resources of constant and state variable storage.

Figure 15:
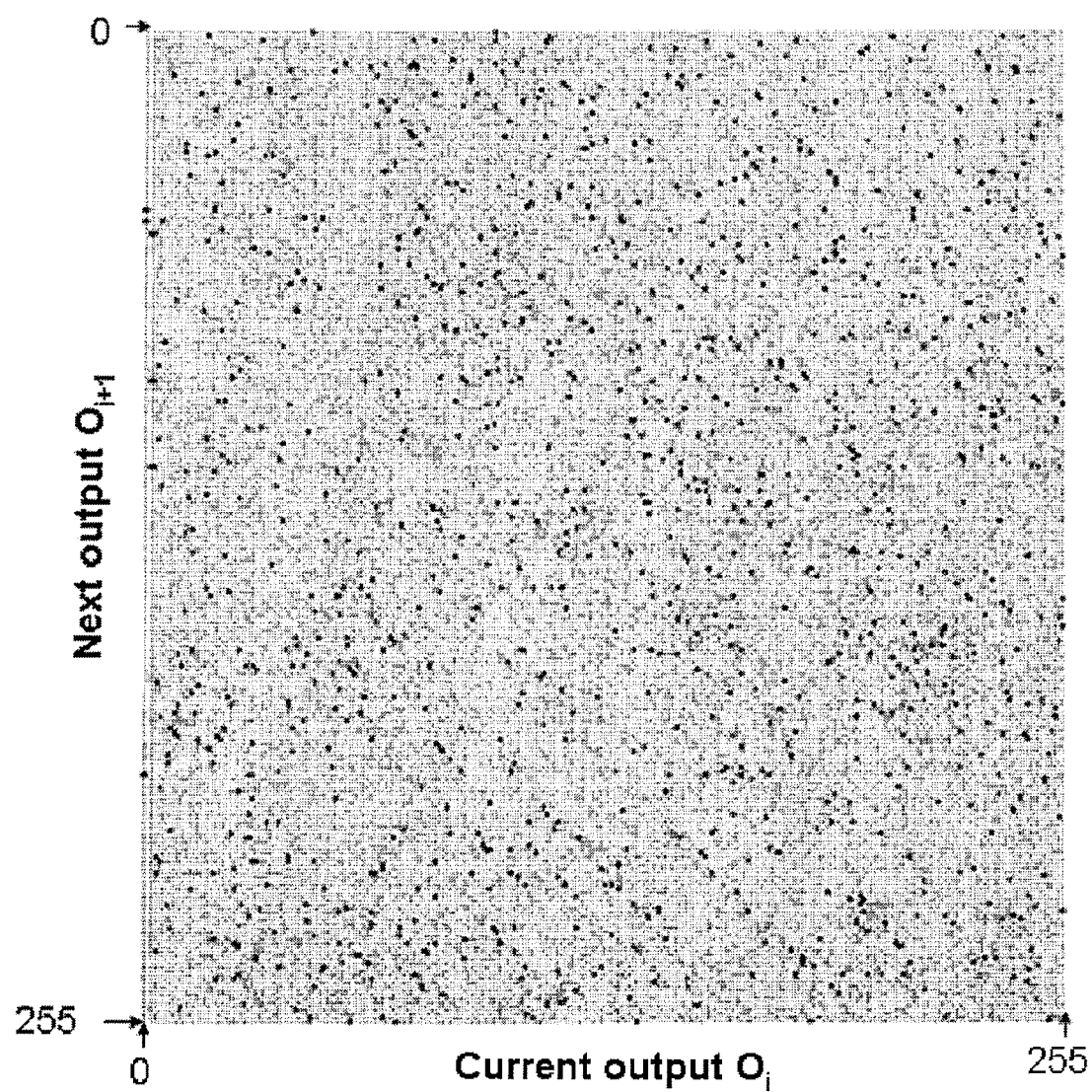
FIG. 15 illustrates a plot of the test results of an exemplary PRNG.

The principle of operation of the knapsack of state modules places the KOPEC approach into the family of nonlinear generators [7], because, viewed as a single binary value, the next state value cannot be expressed as a linear function of past states. Each state module is independent of the rest and each has its own next state function; the overflow or underflow of a state module causes inherently nonlinear transitions when viewed in the binary arithmetic world. This means the KOPEC generator lacks the so-called "lattice" structure of linear generators. Looking at the transition spectrum, the next state points show more similarity to the inversive congruential family. A plot of the distribution of 30,000 next states for KOPEC generator G is given in FIG. 15, where black dots represent transitions taken more than once and gray dots are transitions taken once.

The total state space was already noted to have a size equal to the product of the state module lengths in the knapsack, {L}, at least where the increments {C} are constants [For cascaded counters, the period must be confirmed through further analysis or measurement]. Furthermore, all states are equally accessible as initial conditions, since the individual state modules can be preset to any value. In addition, changes in initialization vector did not change the outcome of statistical tests, although of course the sequence started in a difference place in the period. For small embedded processors where multiplication must be implemented as successive addition, the KOPEC generator is more efficient than nonlinear inversive generators as well. Its addition-only requirements make it similar in efficiency to lagged-Fibonacci generators, but without long initialization. In fact KOPEC generators may serve some applications in combination with lagged Fibonacci generators.

Thus, the KOPEC class of PRNGs disclosed herein provides a mechanism of producing useful quality random numbers with very meager computing resources, such as might be found in networks with very low cost nodes, or in smart cards. Given sufficient further analysis, and access to multiple event streams, KOPEC generators may also be able to serve applications in cryptography. In particular, a form of system level steganography becomes possible in large computing systems by widely distributing the small state machines in the KOPEC generator within different system modules and processes. In the world of simulation, KOPEC generators may serve a role, in conjunction with other generators, to increase the efficiency of simulations.

It should be noted that while coprime factors may be chosen for the knapsack, there is no requirement to do so. Other factors that are not coprime may be used and the primary disadvantage will be a potential reduction in the period for a given number of factors. Thus, there may be a computational cost and statistical cost but it is envisioned that for certain cases and applications the difference between using coprime and non-coprime factors will not be a problem.

APPENDIX I

Sample Source Code for Generator D

This C code serves as a simulator for the KOPEC generator and will produce an output file by appending each 8 bit output as it is produced. The code is a simple inline program with only the main( ) routine and certainly more elegant code is possible, but this sample illustrates the principle:

```
#include <stdio.h>
/* simulator for cascaded KOPEC (7,8)    PRNG       */
/* standard state assignment [D=0]                  */
/* C language using GNU C Compiler                  */
/* Generator D from text of paper,                  */
/* demonstrates operation with indexes x[i]         */
/* in reverse order from text -- x[6] is the        */
/* 256 bit counter which feeds the cascade          */
/* author Bruce Dunbar -- designed 3/16/06          */
/* this demo compiled and tested 5/8/06             */
/* generator will stop and append output to         */
/* a named file, and also send a summary of         */
/* output and transition frequencies to the         */
/* standard output which can be redirected          */
/* and captured in a different file                 */
/* inline single main( ) program                    */
main( )
{
/* set up file I/O for binary output               */
/* declare arrays to count frequencies             */
    FILE *fp;
    FILE *fopen(const char *filename, const char *mode);
    int fclose(FILE *a_file);
    int x[7];
    int L[7];
    int i,j,k,m,n,p;
    int D[7];
    int incr[7];
    int freqcount[256];
    int spectrum[256][256];
    int lastrand;
    int eventcount;
        int init [7];
        int randout;
/* initialize -- choose counter lengths, ranges and increment steps
*/
/* for cascaded generator incr[0]-[5] will not be used
*/
/* the variables D[i] can be used to shift the state assignment
*/
/* D[i] left at zero in this generator
*/
    eventcount=1;
    randout=0;
    lastrand=0;
    i=j=k=m=n=p=0;
        L[0]=211,D[0]=0,incr[0]=k=1;
    L[1]=197,D[1]=0,incr[1]=1;
    L[2]=101,D[2]=0,incr[2]=1;
    L[3]=127,D[3]=0,incr[3]=83;
    L[4]=179,D[4]=0,incr[4]=7;
    L[5]=85,D[5]=0,incr[5]=31;
    L[6]=256,D[6]=0,incr[6]=85;
    for (j=0; j<7; ++j)
        {
            init[j]=15;
            x[j]=init[j];
        }
    for (n=0; n<257; ++n)
        {
            freqcount[n]=0;
            for(p=0; p<257; ++p)
            {
            spectrum[n][p]=0;
            }
        }
/* append generator outputs to the filename and directory specified here */
/* disk names are specific to the machine being used
*/
    fp = fopen("Y:\\projects\\internet0\\out102c.bin", "ab");
/* counter loop -- keep running, collect stats until a key is pressed
*/
/* most useful to redirect stats to an output file
*/
/* x[6] represents 256 bit counter incrementing by constant 85
*/
/* x[0]-x[5] represent the cascaded counters with lengths {L} from the */
/* init section above and x[i+1] as increments
*/
    for (;;)
        {
        for (i=0; i<7; ++i) /*update state vars x[i] */
            {
                incr[0]=k; /*keep from getting reset entering loop*/
            if (i<6)
                {
                x[i]=((x[i] – D[i] + x[i+1]) % L[i]) + D[i];
                }
            else
                {
                x[i]=((x[i] – D[i] + incr[i]) % L[i]) + D[i];
                }
            }
        lastrand=randout;/*save previous output before calculating new */
            randout=(x[0]+x[1]+x[2]+x[3]+x[4]+x[5]+x[6]) % 256;
        /* append the value randout to the designated file as an 8 bit byte
*/
            fwrite(&randout,1,1,fp);
    /* increment counters to count frequency of randout values and number of */
        /* total simulation steps for the generator
*/
            ++freqcount[randout];/*count individual frequency of this output number*/
            ++spectrum[lastrand][randout];/*count pairwise frequency of this output following the previous*/
```

```
        ++eventcount;
        if(kbhit( ))
        {
            break;
        }
    }
    fclose(fp);
/* output statistics after hitting a key        */
    printf("pairwise frequencies:\n");
    for (m=0;m<256;++m)
    {
        for (p=0;p<256;++p)
        {
            printf("%3d,",spectrum[m][p]);
        }
        printf("\n");
    }
    printf("relative frequencies:\n");
    for (m=0;m<256;++m)
    {
        printf("%d,%d\n",m,freqcount[m]);
    }
    printf("final output %d\n",randout);
    printf("number of states generated = %d\n",eventcount);
}
```

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method of generating a random number, comprising:
   a) incrementing a first counter in a first state machine based on a first input occurring at a first frequency, the first counter having a range up to a first limit value;
   b) incrementing a second counter in a second state machine based on a second input occurring at a second frequency, the second counter having a range up to a second limit value, the second limit value being different than the first limit value, wherein both the first and the second limits are not greater than an upper limit;
   c) obtaining the value of the first counter and the second counter in a manner independent of the first frequency and the second frequency; and
   d) storing a random value in memory based on the value of the first and second counter,
   wherein the random value being stored in (d) is based on combining the value of the first and second counters sum modulo said upper limit.

2. The method of claim 1, wherein the sum modulo is based on the upper limit $2^w$ and w is 8.

3. The method of claim 1, wherein the incrementing of the first state machine is sum modulo the first upper limit.

4. The method of claim 1, wherein the incrementing of the first state machine is based on a set of values, wherein at least one of the values in the set of values is greater than one but less than the first limit value.

5. The method of claim 1, wherein the first input and second input are based on an event occurring at a frequency equal to the first and second frequency.

6. The method of claim 5, further comprising N additional state machines, wherein N is such that the total number of state machines is not greater than the number of coprime numbers in the upper limit, wherein each of the state machines are incremented in response to the event occurring at the frequency and the upper limit of each state machine is coprime with the other state machines.

7. The method of claim 5, wherein the incrementing of the first state machine is at least periodically incremented by a value that is greater than one but less than the first upper limit, wherein the value is relatively prime with respect to the upper limit.

8. The method of claim 1, wherein the incrementing of one of the first and the second state machines changes the value of the respective state machine by a numerical value that is greater than 1 and less than the limit of the state machine.

9. The method of claim 1, wherein the first limit value and the second limit value are coprime.

10. A system for generating a random number, comprising:
    a plurality of computing devices each including a counter with a limit, each of the limits for the respective computing devices being coprime with the limits of the other computing devices, the plurality of computing devices configured to increment the respective counters in response to an event occurring at a first frequency; and
    a plurality of processors associated with each of the plurality of computing devices configured to obtain the value of the counters from each of the plurality of computing devices in response to an input, the plurality of processors configured to combine the values of the counters of the plurality of computing devices to generate a random number, wherein the random number is based on combining the value of each of the counters sum modulo the limit of one of the counters.

11. The system of claim 10, wherein the plurality of computing devices have an upper limit for the respective counters of $2^w$.

12. The system of claim 10, wherein the computing devices are configured to be incremented at a frequency that is statistically independent from the input.

13. The system of claim 10, wherein the plurality of processors are further configured to adjust the limits of the plurality of computing devices.

14. A device comprising:
    a housing including at least one communication port;
    a plurality of state modules each including a counter with a limit, each of the limits for the respective state modules being different than the limits of the other state modules, the plurality of state modules configured to increment the respective counters in response to a first event occurring at a first frequency, wherein a first value of at least one of the counters is incremented by a second value of one of the other counters; and
    a controller module in communication with the communication port and the plurality of state modules, the controller module configured to obtain a value associated with each of the counters in the plurality of state machines in response to an input, the controller configured to generate a random number based on the value of each of the counters, wherein the random number is based on combining the value of each of the counters sum modulo the limit of one of the counters.

15. The device of claim 14, wherein the controller is a microprocessor.

16. The device of claim 14, wherein the controller is not capable of combining the values XOR.

17. The device of claim 14, wherein the upper limit of the counters is $2^8$ and number of state modules is at least 30.

18. The device of claim 14, wherein the input occurs at a frequency that is statistically independent from the first frequency.

* * * * *